US009767325B2

(12) United States Patent
Pifer

(10) Patent No.: US 9,767,325 B2
(45) Date of Patent: Sep. 19, 2017

(54) ANALOG CALCULATOR FOR WIND DEFLECTION OF RIFLE BULLETS

(71) Applicant: William Thomas Pifer, Ravenswood, WV (US)

(72) Inventor: William Thomas Pifer, Ravenswood, WV (US)

( * ) Notice: Subject to any disclaimer, the term of this patent is extended or adjusted under 35 U.S.C. 154(b) by 0 days.

(21) Appl. No.: 14/823,558

(22) Filed: Aug. 11, 2015

(65) Prior Publication Data

US 2017/0046542 A1 Feb. 16, 2017

(51) Int. Cl.
*G06F 19/00* (2011.01)
*G06G 1/00* (2006.01)
*G06G 1/08* (2006.01)

(52) U.S. Cl.
CPC ............. *G06G 1/0057* (2013.01); *G06G 1/08* (2013.01)

(58) Field of Classification Search
CPC .... F41G 3/08; F41G 3/14; G06G 1/00; G06G 1/0057; G06G 1/08
USPC ................ 235/400, 405, 406, 417, 418, 419
See application file for complete search history.

(56) References Cited

U.S. PATENT DOCUMENTS

| | | | | |
|---|---|---|---|---|
| 4,311,902 A * | 1/1982 | Koll | G06G 1/08 | 235/78 R |
| 5,960,576 A | 10/1999 | Robinson | | |
| 6,196,455 B1 | 3/2001 | Robinson | | |
| 7,162,825 B2 * | 1/2007 | Ugolini | F41G 1/54 | 33/228 |
| 8,439,256 B2 * | 5/2013 | Hodnett | G06G 1/0057 | 235/406 |
| 8,500,016 B2 | 8/2013 | Finamore | | |
| 8,991,702 B1 * | 3/2015 | Sammut | F41G 1/38 | 235/404 |
| 2008/0098640 A1 * | 5/2008 | Sammut | F41G 1/38 | 42/122 |
| 2012/0031972 A1 | 2/2012 | Hodnett | | |
| 2012/0132708 A1 | 5/2012 | White | | |

* cited by examiner

*Primary Examiner* — Thien M Le
*Assistant Examiner* — April Taylor

(57) ABSTRACT

Certain embodiments of the disclosure may include systems and methods for calculating the wind deflection of a rifle bullet using concentric scales. The scales are marked radially on each side, one side pertaining to wind speed and the opposite side pertaining to wind direction. The scales of one side include indicia of deflection at various wind speeds, and the scales of the other side include indicia for various wind directions. Using both sides together and in sequence, correction can be made for both wind speed and wind direction.

10 Claims, 2 Drawing Sheets

ANALOG CALCULATOR FOR WIND DEFLECTION OF RIFLE BULLETS

CROSS-REFERENCE TO RELATED APPLICATION

Applicant claims the priority of Provisional Application No. 62/036,586 filed Aug. 12, 2014, for Analog Calculator for Wind Deflections of Rifle Bullets, inventor, William Thomas Pifer.

BACKGROUND OF THE INVENTION

The present invention relates generally to long range shooting of bullets and to determining and compensating for deflections due to wind speed and wind direction.

SUMMARY OF THE INVENTION

It is well known that for an accurate long range shot that the shooter must take into account a number of variables. It is known in the art to determine a "known solution" which is the set of parameters that produce a deflection amount known to be correct for the ballistic and atmospheric factors affecting the bullet. Shooters often compile a table of such "known solutions" on a card commonly known as a "dope card" which typically records data such as ballistic parameters, atmospheric conditions, range, and sight corrections values for elevation, wind deflection, and gyroscopic drift or spin drift.

Because it is not practical to chart all deflection amounts for all possible combinations of speeds and directions, a dope card typically only recorded with "full value" wind deflections for only one or two wind speeds. Full value means that the wind direction is perpendicular to the line of fire. Wind direction relative to the line of fire is typically referenced by the origin of the wind as it would relate to a standard clock face, with the clock's center representing the shooter's position, and 12 o'clock representing the position of the target. Wind originating from either the 3 o'clock position or the 9 o'clock position is perpendicular to the line of fire.

The present invention provides a simple, light weight apparatus for determining deflection due to wind speed and wind direction, starting with one "known solution". The analog calculator of the invention has a first series of indicia of deflections relative to wind direction, and an indicator with a scale of wind speeds. The calculator is calibrated using the known solution. Then deflection values at other speeds may be read. The calculator, which is preferably two sided, has a second series of indicia to additionally correct for wind direction relative to full value.

Other objects, features and advantages of the invention will become apparent as this description proceeds.

DETAILED DESCRIPTION OF THE INVENTION

Figure 1:
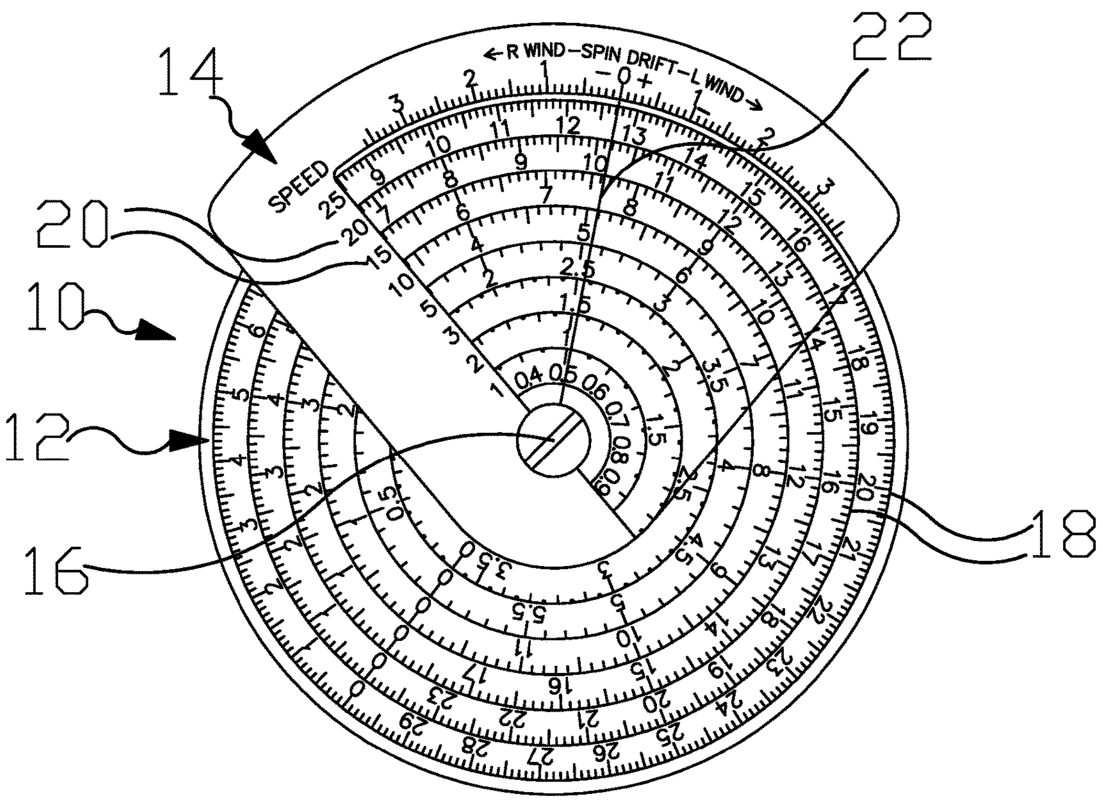
FIG. 1 is a plan view of a presently preferred embodiment of a two sided analog calculator of the invention showing the side for making adjustments for wind speed.

Referring to FIG. 1, reference numeral 10 generally designates a light weight, weather resistant analog calculator for determining the deflection of a rifle bullet due to wind speed and wind direction including a circular disc 12 and a smaller generally triangular indicator member 14. Indicator member 14 is rotatably attached to disc 12 around a pivot 16.

On the side of disc 12 shown in FIG. 1, there are concentric sets of indicia 18 for use in solving for bullet deflection in various wind speeds. A scale of corresponding wind speed indicia 20 are on the indicator member 14. Indicia 20 extend radially outwardly from pivot 16 and progressively increase.

The concentric sets of indicia 18 are arranged so that the values reflect the linear relationship that exists between the correct deflection values for each wind speed. The indicator member 14 has a transparent central section with a radial indication line 22.

To start calculating a typical solution, a shooter starts by calibrating the apparatus using a "known solution" from a "dope card" or other source of such information. The known solution has a specified deflection for a specified wind speed. The indicator member 14 is rotated until the indicator line is on the known specified deflection at the known wind speed. Now using the wind speed the shooter encounters, deflection for the current wind speed may be read at indicator line 22. The value found is "full value" wind deflection for the chosen current wind speed.

Deflection values for wind speeds not listed in wind speed indicia 20 may be found by adding or subtracting values to equal the unlisted wind value.

Figure 2:
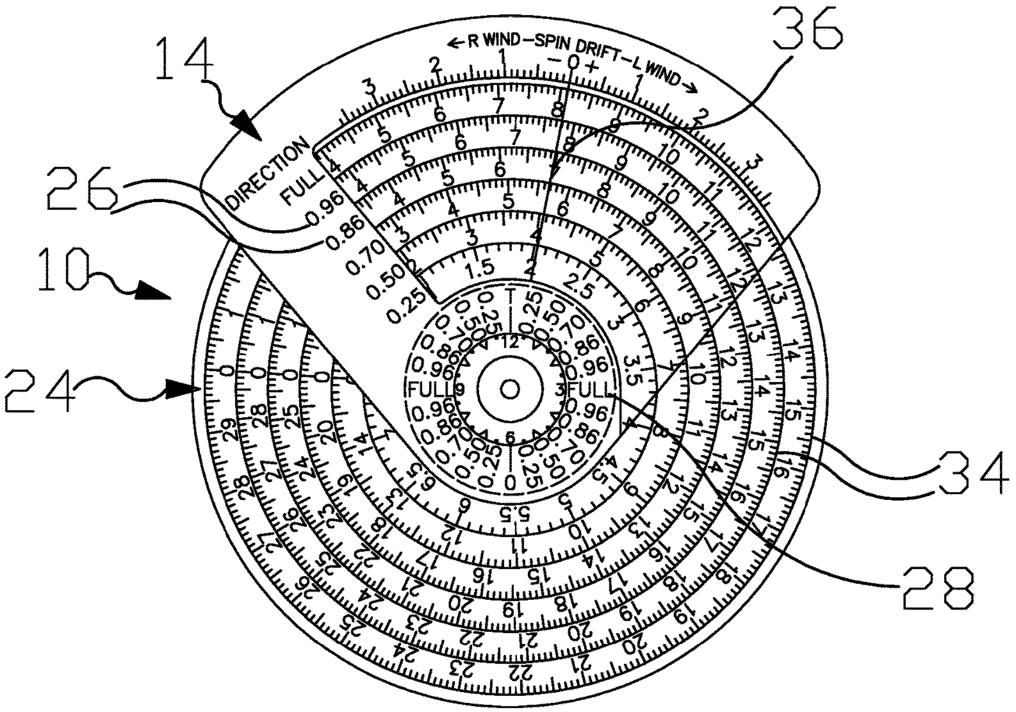
FIG. 2 is a plan view of the other side of the calculator of FIG. 1, for use in making adjustments for wind direction.

FIG. 2, shows the other side of the calculator 10, which is used to solve for wind direction, other than full value. Indicator member 14 has a scale of radially extending indicia 26 of wind direction, including a full value mark. These indicia are based on the direction of the wind relative to the line of fire between the shooter and the target, T.

Figure 3:
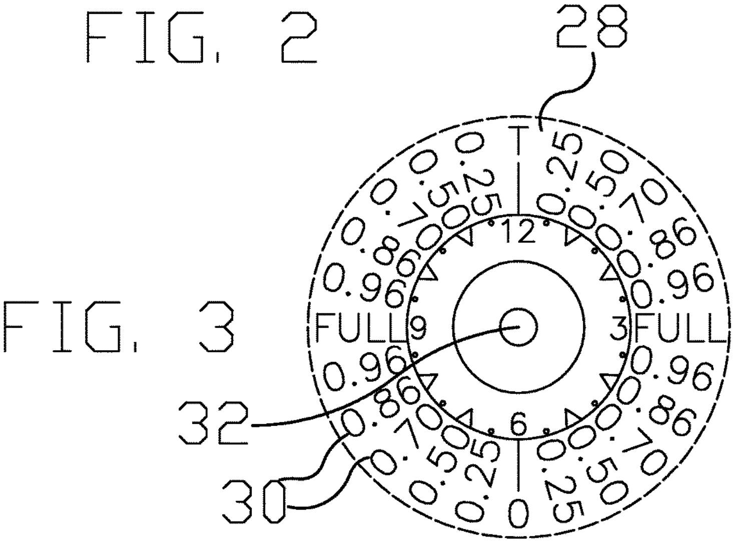
FIG. 3 is a plan view on an enlarged scale of a portion of the FIG. 2 embodiment.

FIG. 3, shows the circular part 28 of indicator member 14 on an enlarged scale. Indicia 30 represent wind direction. Wind direction relative to the line of fire is typically referenced by the origin of the wind relative to a standard clock face. The center at pivot 32 represents the shooter's position, and 12 o'clock represents the target, T. Wind at either 3 o'clock or 9 o'clock are perpendicular to the line of fire and is said to be "full value" 1.00 because deflection will be maximum. Indicator number 14 is marked at its perimeter to add or subtract an external factor, spin drift, from the calculated solution. The circular disc 24 has concentric rings of indicia 34 that indicate deflection at various wind direction indicia 30.

To complete a deflection determination, the shooter takes the deflection value determined for wind speed from FIG. 1, and applies it to FIG. 2. This value is found in indicia 34 using full value, and indicator line 36 is placed on this value. The apparatus is now calibrated, and the correction may be read for the actual wind direction. The direction indicia 30 for other than full value are decimal values less than one.

After a complete wind solution has been readily determined according to the invention; other minor adjustments known in the art may be made. One such external factor is gyroscopic drift, also known as spin drift. The indicator number 14, FIG. 1 and FIG. 2, is used to add or subtract external factors. The indicator member 14 is marked accordingly to perform addition and subtraction of any external factors.

The invention claimed is:

1. An analog calculator for determining deflection of a bullet comprising a flat disc having a first side and an opposite second side, said first side includes a first series of indicia of deflection at various wind speeds, an indicator member movably connected to said disc and having a scale of wind speeds, said indicator member including an indicator line positioned over said first series of indicia, said second side having a second series of indicia of deflection for various wind directions, said indicator member including a second indicator line positioned over said second series of indicia, a scale of values based on wind direction, a circular center portion of said indicator member for selection of said values based on wind direction, whereby a deflection for wind speed determined using said first side of the disc is transferred to said second side for correction for wind direction.

2. A calculator according to claim 1, further comprising a pivot connecting said indicator member to said disc.

3. A calculator according to claim 2, wherein said disc is circular.

4. A calculator according to claim 3, wherein said first series of indicia of deflection are arranged in concentric sets, and said scale of wind speeds on said indicator member extends radially.

5. A calculator according to claim 1, said second series of indicia of deflection are positioned in concentric sets on said second side, and said second indicator line extends radially.

6. A calculator according to claim 5, wherein said second side of said indicator member includes a central circular portion, and means to determine which of said second series of indicia to use based on wind direction relative to the line of fire.

7. A calculator according to claim 6, wherein said means include a standard clock face with a target being at 12 o'clock position and a shooter position being at a central pivot.

8. A calculator according to claim 5, further comprising means on said second side for adding a correction for known spin drift.

9. A method of using an analog calculator for determining deflection of a bullet, the method comprising:

using the analog calculator, the analog calculator comprising:

a flat disc having a first side and an opposite second side, said first side including a first series of indicia of deflection at various wind speeds;

an indicator member movably connected to said disc and having a scale of wind speeds, said indicator member including an indicator line positioned over said first series of indicia;

said second side having a second series of indicia of deflection for various wind directions;

said indicator member including a second indicator line positioned over said second series of indicia;

a scale of values based on wind direction; and a circular center portion of said indicator member for selection of said values based on wind direction; and transferring a value of deflection for wind speed determined using said first side of the disc to said second side for correction for wind direction.

10. The method according to claim 9, further comprising correcting the value of deflection by incorporating a known spin drift correction.

* * * * *